3,467,746
FORMING ARTICLES OF ORGANIC ACID ESTERS OF CELLULOSE WITH LOW MELTING POINTS AND IMPROVED SOLUBILITY AND MOLDING PROPERTIES
Carlton L. Crane and Robert F. Williams, Jr., Rochester, N.Y., assignors to Eastman Kodak Company, Rochester, N.Y., a corporation of New Jersey
Filed Dec. 7, 1966, Ser. No. 598,182
Int. Cl. B29b 3/02; B29c 5/00, 25/00
U.S. Cl. 264—330      5 Claims

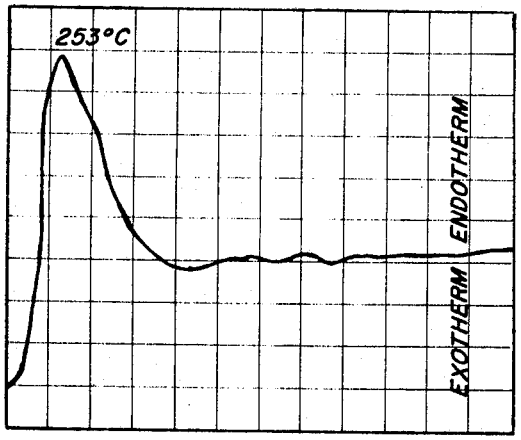
FIG. 1
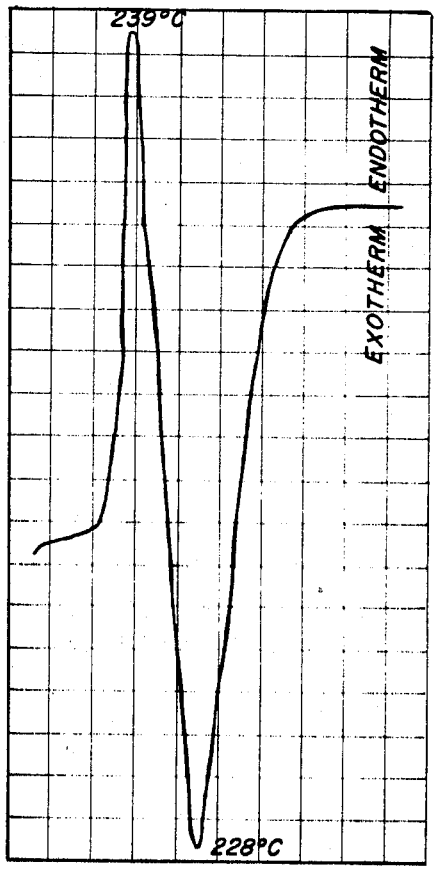
FIG. 2
FIG. 3
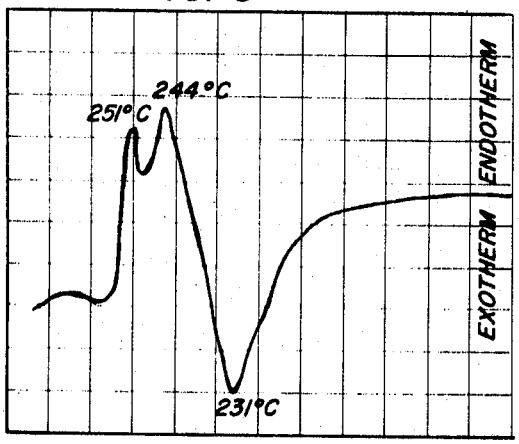
CARLTON L. CRANE
ROBERT F. WILLIAMS, JR.
INVENTORS
ATTORNEYS

United States Patent Office 3,467,746
Patented Sept. 16, 1969

ABSTRACT OF THE DISCLOSURE

It was discovered that, although substantially pure Form II cellulose triesters have softening temperatures which are significantly lower than those of Form I material, Form II triester can be converted into the higher softening temperature material (after an article is made initially at the relatively lower temperature) by subjecting the solidified, shaped article to a temperature between about 105° C. and the heat distortion temperature of the article for a period of time.

---

This invention relates to novel forms of organic acid esters of cellulose such as cellulose tripropionate, which have several unexpected and useful properties that make them especially useful for molding into shaped articles. More particularly, this invention relates to the use of so called Form II cellulose tripropionate as molding materials.

It is known that cellulose triesters with low hydroxyl contents can be molded into articles and forms. For best results, the formed articles should have good dimensional stability, resistance to moisture and high melting points. In order to manufacture cellulose esters with these qualities and which are suitable for use in commercial molding machines, it is desirable that the ester melt and flow under pressure at as low a temperature as feasible to avoid the decomposition range. However, after the article has been molded into the desired form, it is desirable that the melting point be as high as possible, particularly where high temperatures may be encountered, for instance, in electrical equipment and industrial piping. It is also desirable that at high temperatures the molded article be dimensionally stable and resistant to moisture.

Cellulose triesters such as triacetates, tripropionates, tributyrates, and trivalerates can be manufactured by methods such as are described in U.S. Patent 3,047,561 to Crane or in U.S. Patent 3,089,871 to Malm and Crane. The products formed dissolve in their esterification baths and have hydroxyl contents of 0.3% or less. Cellulose tripropionates manufactured by these esterification methods, wherein the esterification bath is diluted and the product precipitated by pouring it into water or weak acid solutions, usually have melting points in the range of 244° to 254° C. Products having such very low hydroxyl contents are necessary for proper commercial acceptability due to the excellent moisture resistance of products made therefrom. However, such high melting points are not desired during the molding operation. Significantly lower melting points are desired. However, if the melting points are lowered by conventional means; for example, by making cellulose triesters having somewhat lower molecular weights (and thus having lower intrinsic viscosities) the resulting products have significantly inferior dimensional stability and moisture resistance, and the melting points of the final molded products are then unacceptably low. Actually what was needed heretofore was a way to reduce the melting point of cellulose triesters such as cellulose tripropionate temporarily, until the material is molded, so that when (and if) it is desired to have a final molded product having a higher melting point (than that of the material during the molding step), the material could be treated after it was molded to increase its melting point.

A first object is to provide methods whereby a cellulose triester can be molded at reduced temperatures, yet treated either during or after molding to produce an increase in the melting point, moisture resistance and dimensional stability of the molded article.

We have discovered that the melting points of certain cellulose esters depend upon the method used to isolate them from solution. More particularly, we have discovered that the melting point of cellulose tripropionate, for example, can be lowered by a hot reverse precipitation treatment, comprising the addition of hot acetic acid or water (110°–200° F.) to a solution of the ester, carried out either in the original esterification bath or as an aftertreatment of already solidified ester. This method does not, however, adversely affect other desirable properties of the ester as, for example, its low hydroxyl content (0.3% or less), low total sulfur, intrinsic viscosity, etc. to any substantial degree.

These low melting forms of the esters can be molded considerably below their decomposition temperatures. Then, by suitable treatment during or after the molding operation, the low melting form can also be transformed, if desired, to a product of high dimensional stability, moisture resistance and higher melting point.

When the low melting ester is made directly from an esterification bath, our invention is not limited to any particular method of cellulose pretreatment and any suitable method of activation may be used. Nor is our invention restricted to any particular catalyst system, but can be utilized in any esterification reaction which employs any of the catalysts known to the art.

The hot precipitation step similarly is not limited to the use of any one hot precipitant, (e.g., acetic acid, methanol, ethanol, cyclohexane, aliphatic organic liquids having boiling points between about 94° F. and about 200° F., and water), but can be carried out with any heated (110°–200° F.) substance which, when imparted to the bath, will cause the ester to precipitate therefrom. The important thing is that the precipitation step of these processes be essentially completed while the bath is at a temperature within this range.

When our invention is used to convert one form of previously precipitated ester to the low melting form, the method used to obtain the previous precipitate is irrelevant insofar as the successful practice of the present invention is concerned.

For convenience only, and not as a limitation of our invention, the descriptions in this specification will relate to cellulose tripropionate. To aid the presentation of our invention, the higher melting cellulose tripropionate shall be identified as Form I, and the lower melting form of the ester shall be termed "Form II cellulose tripropionate" (or simply "Form II").

THE FORMS OF CELLULOSE TRIPROPIONATE

The prior art does not recognize that there can be more than one form of cellulose tripropionate. Moreover, it has not been known that a form of cellulose tripropionate having a melting point of less than 243° C. can exist. Our discovery of that fact is singular. So, too, is our discovery of how to consistently make this lower melting form.

Form I cellulose tripropionate has a hydroxyl content of 0.3% or less and a melting point of 243 to 254° C. as determined by the Block melting point method. This is the older form of cellulose tripropionate. Form I cellulose tripropionate has an inherent viscosity in methylene chloride-methanol (9:1) of 1.0 to 2.5 and also exhibits only a limited solubility at 10% concentration in acetonitrile-anhydrous 3A alcohol (1:1), i.e., it forms at least a hazy semi-solution or at best a definite two-phase system consisting of a clear liquid upper layer and an opaque, semi-solid or solid lower layer. In cyclohexaneacetone (7:3), at a 10% concentration of Form I cellulose tripropionate a two-phase system is formed consisting of a clear liquid upper layer and a substantially solid lower layer.

Substantially pure Form II cellulose tripropionate, also has a hydroxyl content of 0.3% or less. However, it has a melting point of less than 243° C. by the Block melting point method. It also has an inherent viscosity in methylene chloride-methanol (9:1) of 1.0 to 2.5 and dissolves at 10% concentration in acetonitrile-anhydrous 3A alcohol (1:1) to form a clear, viscous, substantially grain-free solution. In a 10% concentration in cyclohexane-acetone (7:3) system, Form II cellulose tripropionate is very highly swollen and appears to be on the verge of dissolving.

The different forms of cellulose tripropionate may also be identified by their differential thermal analysis curves (DTA). FIGURES 1, 2 and 3 show, respectively DTA curves for substantially pure Form I cellulose tripropionate substantially pure Form II cellulose tripropionate, and a mixture of Forms I and II.

As a matter of fact, DTA represents an excellent analytical method for determining whether or not a particular sample of cellulose tripropionate is substantially pure Form II.

To determine this fact, a small sample of the cellulose tripropionate can be tested in a conventional DTA apparatus in which the temperature of the sample is increased at a rate of 2.5° C. per minute. (FIGURES 1, 2 and 3 were obtained in this way.) If the sample, first of all, makes a large exothermic deviation, followed by a single endothermic peak at a temperature below 243° C., (in a manner such as that illustrated by FIGURE 2) then it is substantially pure Form II cellulose tripropionate, and is the material discovered by us to have the valuable properties set out hereinbefore. The DTA curve of relatively pure Form I cellulose tripropionate, by comparison, has a single endothermic peak, at a temperature of 243° C. or higher. This is illustrated by FIGURE 1. Mixtures of Form I and Form II cellulose tripropionate yield DTA curves (such as that illustrated by FIGURE 3) having both an initial significant exotherm and at least one endothermic peak at a temperature above 243° C. So long as there is no more than about 5 weight percent of Form I material in admixture with the Form II material of the present invention, most of the benefits that can result from practicing this invention apparently can be obtained. Thus, cellulose tripropionates having at least one significant, identifiable endothermic DTA peak at a temperature of 243° C. or higher, when the DTA data is obtained using a heating rate of 2.5° C. per minute is either pure Form I or a mixture of Forms I and II cellulose tripropionate containing too much Form I (i.e., more than about 5 weight percent of Form I).

METHODS OF PRODUCING FORM II CELLULOSE TRIPROPIONATE DIRECTLY BY ESTERIFICATION AND CONTROLLED PRECIPITATION

By controlling the methods used to isolate the cellulose ester from the esterification bath, a substantially pure Form II cellulose tripropionate can be produced.

Example I.—Esterification reaction solution

Cotton linters were soaked in approximately 30 parts of 180 to 190° F. distilled water, centrifuged and placed in a sigma bladed mixer together with 3 parts of propionic acid. The mass was stirred for 15 minutes at a jacket temperature of 80° F., then transferred to the centrifuge and centrifuged. The propionic acid dehydration process was repeated until the liquid on the cellulose calculated 92% as propionic acid or greater.

Then 98 parts of the activated linters consisting of 50 parts cotton linters and 48 parts of 97.3% propionic acid were mixed in a jacketed sigma bladed mixer with 200 parts (26° F.) 97% propionic anhydride. The entire mass was then cooled to 36° F. and a mixture consisting of 0.92 part of 94.7% sulfuric acid mixed with 2 parts of propionic acid was added to the mixer over a period of 5 minutes. The reaction temperature of the mixer rose to 46° F. during the catalyst addition and, after 4 hours with cooling by jacketed water, reached a maximum of 69° F. The reaction temperature was then allowed to rise to 76°–80° F. until esterification was complete. 1.8 parts of solid 86% $MgCO_3$ was then added directly to the mixer and the temperature of the reaction bath was raised to 250° F. over a period of 2.25 hours. The reaction mixture was held at 250° F. for 6.75 hours for a total esterification time of 9 hours.

Then 9.8 parts of this undiluted reaction solution were placed in a jacekted turbo mixer, stirred and diluted with 21.8 parts of acetic acid, then heated to 160–170° F. 60 parts of 42.5% acetic acid heated to 160–170° F. were added to the mixer in a slow stream until finely divided precipitate was formed. The precipitate was drained and washed in several successive changes of distilled water until it was substantially free of uncombined acid. Then it was boiled in distilled water for 2 hours, drained, covered with 30 parts of water (containing .0022 part oxalic acid) per part of cellulose tripropionate and boiled 2 more hours. It was then washed 3 times with 180° F. water and then dried at 150° F. The product analyzed as follows:

| | |
|---|---|
| Melting point °C | 237 |
| Char point °C | 286 |
| OH percent | 0.1 |
| Ash percent | .01 |
| Total S percent | .0015 |
| $[\eta]$ [a] | 1.70 |

[a] Methylene chloride-methanol, 9:1, appearance at 10% concentration in acetonitrile-anhydrous 3A alcohol (1:1) clear, grain-free solution.

This product is "Form II" cellulose tripropionate.

Example 2

53 parts of air dried cotton linters were soaked in water and then dehydrated with successive changes of propionic acid until the liquid remaining on the linters was 96% propionic acid were placed in a jacketed sigma bladed mixer together with 200 parts of 97% propionic anhydride. The mass was stirred and cooled to 40° F. A mixture consisting of 0.92 part 94.7% sulfuric acid and 2 parts propionic acid were added to the mixer and the reaction temperature was allowed to rise to a maximum of 77° F. over a period of 11 hours.

At the end of this time, a clear viscous solution was formed. 1.8 parts of magnesium carbonate were then added to the mixer and the mass heated and stirred at 250° F. for a period of 8.5 hours.

Cooling water was then circulated through the mixer jacket and the reaction solution was diluted with 720 parts of acetic acid.

(A) Precipitation of Form I material.—100 parts of the diluted solution were added to comminutor equipped with a .09-inch diameter screen together with sufficient distilled water to provide a 50% acetic acid concentration in the precipitation bath. The finely divided white product was drained, washed in successive changes of distilled water until free from uncombined acids and then boiled in water for two hours.

The product was strained, covered with distilled water containing .005 part 88% oxalic acid for each part cellulose tripropionate and boiled for two hours. The product was further washed until free from uncombined acids and dried. The dry product, when dissolved at 10% concentration in acetonitrile-anhydrous 3A alcohol (1:1), formed an opaque partial solution, exhibited much grain and contained large gel particles. This product was Form I cellulose tripropionate. See Column A of the following table for the analysis of this material.

(B) Precipitation of Form II material.—30 parts of the diluted solution were transferred to a tank equipped with a rapidly moving agitator and 20 parts (180° F.) of 50% aqueous acetic acid were added to the reaction solution followed by 40 parts of (180° F.) 15% aqueous acetic acid until a fine white precipitate was formed. The precipitate was drained and washed until substantially free from uncombined acids then boiled for 2 hours in distilled water containing .005 part 88% oxalic acid per part of cellulose tripropionate.

The product was further washed until free from uncombined acids and dried. The dry product dissolved at 10% concentration in (1:1) acetonitrile-anhydrous 3A Ethyl alcohol to form a uniform, clear solution. The fine white uniform powder was substantially pure Form II cellulose tripropionate and analyzed as indicated in column B:

|  | A | B |
| --- | --- | --- |
| Hydroxyl, percent | 0.10 | .12 |
| Intrinsic viscosity in methylene chloride-methyl alcohol (9:1) | 1.83 | 1.81 |
| Melting point, °C | 251 | 237 |
| Char point, °C | 296 | 287 |
| Sulfur (Total), percent | .003 | .002 |
| Ash content, percent | .016 | .016 |
| Form | I | II |

Example 3

12.9 parts of air dried refined wood pulp were activated and dehydrated in the same manner as described in Example 2.

23.7 parts of the activated mixture consisting of 12 parts pulp and 11.7 parts of 94.9% propionic acid were placed in a jacketed sigma bladed mixer together with 48 parts 97% propionic anhydride. The mass was stirred and cooled to 40° F.

A mixture consisting of 0.22 part 95.3% sulfuric acid and 0.3 part propionic acid were then added to the mixer and the reaction temperature allowed to rise to 80° F. over a period of 13.5 hours.

At the end of this period of time, 0.43 part of 86% magnesium carbonate were added to the reaction bath and the temperature of the viscous solution raised to 250° F. over a period of 1 hour and maintained at 250° F. for a period of 8 hours.

36 parts of the reaction solution were then diluted with 150 parts acetic acid, filtered while still hot, and placed in a tank equipped with a rapidly moving agitator and the temperature of the solution adjusted to 170° F.

A mixture consisting of 80 parts acetic acid and 200 parts distilled water at 170° F. were added to the 170° F. agitated solution until a fine uniform slurry was obtained. Distilled water was then added to the bath in amounts sufficient to harden the precipitate and the slurry was drained.

The fine white product was washed in successive changes of distilled water until substantially free from acid.

The product was then boiled in distilled water for 2 hours and drained. The drained product was covered with distilled water containing oxalic acid sufficient to provide .0022 part oxalic acid for each part cellulose tripropionate. After boiling this mixture for 2 hours, the product was drained, washed in successive changes of distilled water until free from uncombined acids and dried. The dry product analyzed as follows:

Melting point _____ °C__ 233
Char point _____ °C__ 285
Hydroxyl _____ percent__ .07
Sulphur (total) _____ percent__ .002
Intrinsic viscosity in methylene chloride-methyl alcohol (9:1) _____ 1.44
Form _____ II A 10% solution of this material in acetonitrile-anhydrous 3A alcohol (1:1) was clear and uniform, further indicating a substantially pure Form II ester.

In U.S. 2,596,656, issued to Crane, one step in the process disclosed therein consists of the addition of hot (180°–190° F.) distilled water to an acetylation bath as a means of precipitating a cellulose acetate product. As can be seen from Example 1 (column 5, line 43) of the Crane patent, the hot reverse precipitation with distilled water produced a cellulose triacetate (43.8%) with a 290° C. melting point. This is typical of the high melting points of the older types of triacetates. In contrast to this, the following Example 4 shows that by controlling the precipitation conditions properly, hot reverse precipitation of cellulose tripropionate with distilled water unexpectedly can be used to manufacture a substantially pure Form II cellulose tripropionate composition of lower melting point.

Example 4

12 parts of linters were combined with 11.8 parts of 95.8% propionic acid as described in Example 1. This mixture was placed in a jacketed sigma bladed mixer with 46.8 parts of 97% propionic anhydride (38° F.). The entire mass was cooled to 40° F. and a mixture of 0.218 part of 95.9% sulfuric acid dissolved in 1.4 parts of propionic acid was added to the reaction bath over a period of 3 minutes. During the addition of the catalyst solution, the reaction temperature rose to 45° F.

After 6.5 hours, the reaction temperature of the mass reached a maximum of 78–79° F. The uniform viscous solution was neutralized with 0.418 part of 86% magnesium carbonate. The temperature of the mass was raised to 250° F. over a period of one hour and maintained for 8 hours at 250° F.

When the reaction was complete, the solution was diluted with 210 parts of acetic acid and cooled to 190° F. 190 parts of 170° F. reaction solution was then further diluted with 180 parts of acetic acid and cooled to 120° F. Distilled water heated to 120° F. was added to the reaction solution as rapidly as possible and when the addition was completed, a fine precipitate was formed. The finely divided precipitate was washed in 15 one-hour changes of distilled water until free from uncombined acids and the product was then boiled in distilled water for 2 hours. The product was covered with 15 parts of distilled water per part of cellulose tripropionate and a mixture consisting of 5 parts distilled water containing technical grade 88% oxalic acid equivalent to .0022 part per 1 part of cellulose triproprionate was added to the slurry. The slurry was boiled for 2 hours. The product was then drained and washed in 3 changes of 160° F. distilled water, centrifuged and dried at 160° F. The product exhibited a (Form II) melting point of only 238° C. (Block).

When dissolved at 10% concentration in acetonitrile-anhydrous 3A alcohol (1:1) a clear, uniform solution was formed almost completely free of grain and gel areas, indicating a substantially pure Form II material. When added at 10% concentration to a 7:3 mixture by cyclohexane-acetone, the mass was completely swollen by the solvent system with very slight tendency to form a two-phase system, indicating a Form II cellulose tripropionate.

Analysis of the product yielded the following:

$[\eta]$ in methylene chloride-methanol (9:1) _____ 1.74
OH _____ percent__ 0.067
Total sulfur _____ percent__ 0.0015
M.P. (Block) _____ °C__ 238
C.P. (Block) _____ °C__ 290
DTA—Prefusion exotherm _____ °C__ 226
DTA—Crystalline M.P. _____ °C__ 240

METHODS OF CONVERTING FORM I AND MIXTURES OF FORMS I AND II TO SUBSTANTIALLY PURE FORM II

Example 5

50 parts of Form I cellulose triproprionate obtained by the method described in Example 2 (A) was dissolved in 575 parts of acetic acid. 200 parts of the solution were heated to 180° F. and 300 parts of 180° F. 40% acetic acid were added in a slow stream, with agitation, until a fine uniform precipitate was formed. The product was washed in three 1-hour changes of distilled water, then boiled 2 hours in distilled water containing 0.11 part of oxalic acid. The product was washed in 5 changes of 160° F. distilled water, centrifuged and dried.

|  | Starting Ester, Form I | Reprecipitated Ester, Form II |
|---|---|---|
| Block M.P., ° C | 250 | 234 |
| Char point, ° C | 295 | 295 |
| Intrinsic viscosity in methylene chloride-methanol (9:1) | 1.77 | 1.70 |
| OH, percent | 0.11 | 0.10 |
| Total S, percent | .002 | .0014 |

Thus the hot reverse precipitation caused a 16° C. decrease in the melting point of the starting ester, indicating the conversion to Form II. Also the reprecipitated ester dissolved in a (1:1) acetonitrile-anhydrous 3A alcohol system, at 10% ester concentration, producing only slight haze, whereas the starting Form I ester in the same solvent system gave a hazy semi-soluble opaque system with most of the two-phase system consisting of larger areas of insoluble particles. At 10% ester concentration in a cyclohexane-acetone (7:3) system, the reprecipitated ester produced a two-phase system consisting of a very highly swollen solid lower layer and a small amount of clear liquid upper layer. This solubility is also characteristic of Form II cellulose tripropionate.

MOLDING OF LOW MELTING "FORM II" CELLULOSE TRIPROPIONATE

It is well known that cellulose tripropionate will discolor as molding temperatures are increased. It is significant, then, that the Form II triproprionate, which can be molded at lower temperatures than presently known tripropionates, can be molded at lower temperatures with less risk of discoloration. In an actual molding run, Form II molded at a 30° C. lower heat block temperature (at atmospheric pressure) than did Form I.

As has been demonstrated in Example 5 above, cellulose triproprionate can be converted by our invention from Form I to Form II. Form II can be made from either substantially pure Form I material or a mixture of forms. Thus, regardless of the esterification method used to produce cellulose triproprionate, a substantially pure Form II may be made prior to molding by careful precipitation in accordance with the processes of our invention. The ease and economy with which the conversion to the lower melting form can be made is apparent, since the hot reprecipitant may be re-used many times if it is acetic acid or some other suitable composition, or it may be discarded, if water is used.

The use of such Form II triesters enable those in the art to form molded articles at lower temperatures to obtain the substantial benefits resulting therefrom. We have discovered that the molded articles can then be heat treated either during molding or subsequent thereto in order to raise substantially the heat distortion temperature of the resulting formed articles. Once Form II is properly heat treated, it acquires the properties of a Form I material, such as a higher melting point and higher heat distortion temperature.

The "heat treatment" referred to above involves, simply maintaining the temperature of the articles molded using Form II material within the range of from about 105° C. and the heat distortion temperature of the cellulose triester for a period of time sufficient to result in a significant increase in the heat distortion temperature (which, for example, is about 239° C. for the sample used to make FIGURE 2). Generally, at least about fifteen minutes (and preferably at least about 25 minutes) are required to accomplish a substantial (1° C. or more) increase in the heat distortion temperature. It is believed that such heat treatment results in the conversion of Form II material to the higher melting Form I.

What is claimed is:

1. In a process for manufacturing shaped articles that contain at least one cellulose triester, which process comprises the steps of
    (a) forming molten triester by melting said cellulose triester,
    (b) placing said molten triester in a mold,
    (c) cooling said molten triester in said mold to thereby form said shaped article, and
    (d) removing said shaped article from said mold after the temperature of said shaped article has dropped below the heat distortion temperature of said cellulose triester;
the improvement which comprises initially utilizing substantially pure Form II cellulose triester in step (a) of said process, and heat treating said shaped article after step (c) for at least about 15 minutes at a temperature between about 105° C. and said heat distortion temperature to thereby increase said heat distortion temperature by at least about 1° C.; said Form II cellulose triester having at most 0.3% hydroxyl.

2. A process as in claim 1, whereby said cellulose triester is selected from the group consisting of cellulose triacetate and cellulose triproprionate.

3. A process as in claim 2, whereby said cellulose ester is cellulose triproprionate and said shaped article is heat treated at a temperature between about 105° C. and 239° C., but below the heat distortion temperature of said cellulose triproprionate, for a period of time equal to at least about 15 minutes.

4. A process as in claim 3, wherein said period of time is at least about 25 minutes.

5. A process as in claim 1, wherein said cellulose triester is cellulose trivalerate.

References Cited

UNITED STATES PATENTS

| 1,972,166 | 9/1934 | Schneider | 264—330 |
| 2,028,502 | 1/1936 | Crane et al. | 264—346 |
| 2,303,339 | 12/1942 | Dreyfus | 264—330 |
| 2,407,962 | 9/1946 | Nason | 264—330 |
| 2,596,656 | 5/1952 | Crane | 260—230 |
| 2,992,214 | 7/1961 | Mench | 260—227 |
| 3,089,871 | 5/1963 | Malm et al. | 260—227 |

ROBERT F. WHITE, Primary Examiner

JEFFERY R. THURLOW, Assistant Examiner

U.S. Cl. X.R.

260—230; 264—235